(12) United States Patent
Weed et al.

(10) Patent No.: US 7,606,665 B2
(45) Date of Patent: Oct. 20, 2009

(54) SYSTEM AND METHOD FOR EMPLOYING AN AIDED-ALIGNMENT MODE TO ALIGN AN INERTIAL REFERENCE SYSTEM

(75) Inventors: Doug Weed, Forest Lake, MN (US); James Broderick, Maple Grove, MN (US); Thomas Ryno, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 891 days.

(21) Appl. No.: 10/929,825

(22) Filed: Aug. 30, 2004

(65) Prior Publication Data

US 2006/0047427 A1    Mar. 2, 2006

Related U.S. Application Data

(60) Provisional application No. 60/499,097, filed on Aug. 29, 2003.

(51) Int. Cl.
*G01C 21/00* (2006.01)
(52) U.S. Cl. .................................. 701/220; 701/221
(58) Field of Classification Search .......... 701/200–221
See application file for complete search history.

(56) References Cited

U.S. PATENT DOCUMENTS

| 4,930,085 | A | 5/1990 | Kleinschmidt |
| 5,527,003 | A | 6/1996 | Diesel et al. |
| 6,278,945 | B1 * | 8/2001 | Lin .............................. 701/216 |
| 6,453,239 | B1 | 9/2002 | Shirasaka et al. |
| 2002/0021245 | A1 | 2/2002 | Lin et al. |

* cited by examiner

*Primary Examiner*—Richard M. Camby
(74) *Attorney, Agent, or Firm*—Black Lowe & Graham PLLC (57) ABSTRACT

A system and method for aligning an inertial reference system, which is coupled to a moveable body, is provided. The method includes obtaining unaided navigation state information from an unaided source, and obtaining aiding state information from an aiding source. The unaided navigation state information is generated by the unaided source using navigation information provided by an inertial reference, and the aiding state information is generated by the aiding source using navigation information provided by at least one external reference.

The method also includes determining an unaided navigation solution using the unaided navigation state information, and determining an aided navigation solution using a combination of the unaided and aiding state information. As a default, the method provides the unaided navigation solution for navigating the movable body. When the aided navigation solution provides a better solution for navigating the movable body, the unaided navigation solution is replaced with the aided navigation solution.

36 Claims, 5 Drawing Sheets

FIG. 2

SYSTEM AND METHOD FOR EMPLOYING AN AIDED-ALIGNMENT MODE TO ALIGN AN INERTIAL REFERENCE SYSTEM

REFERENCE TO RELATED APPLICATIONS

The present application claims the benefit of U.S. Provisional Patent App. Ser. No. 60/499,097, filed Aug. 29, 2003, entitled "System and Method for Aligning an Inertial Navigation System Having an In-Motion Alignment Mode," the entirety of which is incorporated herein by reference.

FIELD

The present invention relates to navigation systems, and more particularly to a system and method for aligning an Inertial Reference System so as to achieve a navigation solution for a movable body. The system and method are particularly useful for aligning a strapdown IRS when a body to which the strapdown IRS is attached is in motion and/or when the IRS failed to complete a stationary alignment.

BACKGROUND

Inertial navigation is the process of navigating a body (such as an aircraft) using an Inertial Reference System ("IRS"), which is coupled to the body. To do this, the IRS may calculate a navigation solution of the body using its self-contained or "un-aided" sensors, such as accelerometers, gyroscopes and barometric sensors. As described in more detail below, the navigation solution may, depending on the operational mode of the IRS, include all or portions of an attitude, position and velocity of the body.

Before navigation can commence, the IRS typically undergoes a self-alignment process that establishes a relationship between coordinates of the body and a local geographic reference. This self-alignment process generally includes the functions of (i) leveling the IRS and (ii) determining an initial azimuth of the IRS, which is also known as gyrocompassing. To perform the leveling function, the IRS may align, using its unaided sensors (e.g., gyroscopes and accelerometers), a vertical axis of its local-level-coordinate frame with a sensed acceleration vector. To determine the initial azimuth, the IRS may measure a horizontal earth rate.

To carry out the self-alignment process, the IRS (and the body to which it is attached) has to remain substantially stationary for a period of time. Such process is commonly and aptly named the "stationary-alignment mode." The stationary-alignment mode is the typical alignment mode for the IRS, and is performed each time power is applied to the IRS so long as the IRS remains stationary for the duration of the stationary alignment. A typical duration for the stationary-alignment mode may be, for example, between 3 and 17 minutes. The duration, however, may be less than or greater than this exemplary range, and may be a function of latitude.

After the stationary-alignment mode is completed, the IRS device may transition to a navigation mode. In the navigation mode, the IRS supplies full navigational parameters for the body to which it is attached. That is, the IRS supplies an attitude, position and velocity of the body.

In addition to the stationary-alignment and navigation modes, the IRS may be operated in a reversionary-attitude mode to allow quick recovery of attitudes, body rates, and body accelerations in the event of an interruption of power or excessive movement during the stationary-alignment mode. The reversionary-attitude mode, however, is not used to align the IRS, but rather allows for continued navigation with less than full navigational parameters. To allow such continued navigation, the reversionary-attitude mode may implement a non-accelerating assumption, via, for example, a second order control loop, to maintain a leveled platform to allow the IRS to derive pitch and roll attitudes.

In reversionary-attitude mode, however, the IRS does not provide a valid self-computed heading output. Instead, the heading output is set to a null condition, and remains in this condition until it receives an initial set heading input. An initial set heading (magnetic, true or otherwise) may be input into the IRS as a reference for the derived platform heading. The set heading may be input periodically to maintain an accurate heading output while the IRS is in the reversionary-attitude mode.

Typically, the IRS is powered by two power sources. When both of these sources are interrupted for a predetermined period, e.g., greater than 20 milliseconds, the IRS is generally reset. On reset, the IRS (through user interaction) may enter (i) the stationary-alignment mode before transitioning to the navigation mode (assuming navigation mode, in fact, can be attained) or (ii) the reversionary-attitude mode and continue to operate without the ability to transition to the navigation mode.

If, for example, the IRS undergoes a power interrupt and is reset while the body is stationary, then the user may cause (e.g., by flipping a switch) the IRS to enter the stationary-alignment mode. Once the stationary-alignment mode is completed, the IRS may transition to the navigation mode via user interaction. The reversionary-attitude mode, however, is typically used when the interruption of power occurs while the body is in motion. However, the reversionary-attitude mode may be used if the body undergoes excessive movement before the stationary-alignment mode is completed.

SUMMARY

A system and method for carrying out an alignment process of an inertial reference system ("IRS") that is coupled to a moveable body is provided. The method for carrying out the alignment process may include obtaining unaided navigation state information from an unaided source, and obtaining aiding state information from an aiding source. The unaided source may generate the unaided navigation state information using navigation information provided by an inertial reference, and the aiding source may generate the aiding state information using navigation information provided by at least one external reference, e.g., a civilian grade global positioning system.

The method may also include determining an unaided navigation solution using the unaided navigation state information, and determining an aided navigation solution using a combination of the unaided and aiding state information. As a default, the method provides the unaided navigation solution for navigating the movable body. When the aided navigation solution provides a better navigation solution for navigating the movable body, the method replaces the unaided navigation solution with the aided navigation solution.

BRIEF DESCRIPTION OF THE DRAWINGS

Preferred embodiments are described with reference to the following drawings, wherein like reference numerals refer to like elements in the various figures, and wherein.

DETAILED DESCRIPTION

Overview

As noted above, aligning an inertial reference system ("IRS") establishes a relationship between coordinates of the body and a local geographic reference. Unlike a conventional IRS, the alignment process described herein may be carried out using the stationary-alignment mode and/or using an aided-alignment mode. Like the stationary-alignment mode, the aided-alignment mode may be used to achieve navigational capability (i.e., develop a navigation solution) for the body. Unlike the stationary-alignment mode, however, the aided-alignment mode may be performed (i) at any time after cycling of power of the IRS, (ii) whenever the body is in motion, and/or (iii) whenever the body aborts stationary-alignment mode, which may happen when the body moves excessively during the stationary-alignment mode.

The aided-alignment mode may be carried out in a variety of ways. For instance, the aided-alignment mode may be carried out using (i) an in-motion alignment mode; (ii) a combination of the in-motion alignment mode and the reversionary-attitude-mode; (iii) a combination of the in-motion alignment mode and a warm-start-initialization mode; (iv) a hot-start-initialization mode; or (v) some other combination of the in-motion alignment, reversionary-attitude, warm-start and hot-start initialization modes.

Architectural Overview

Figure 1:
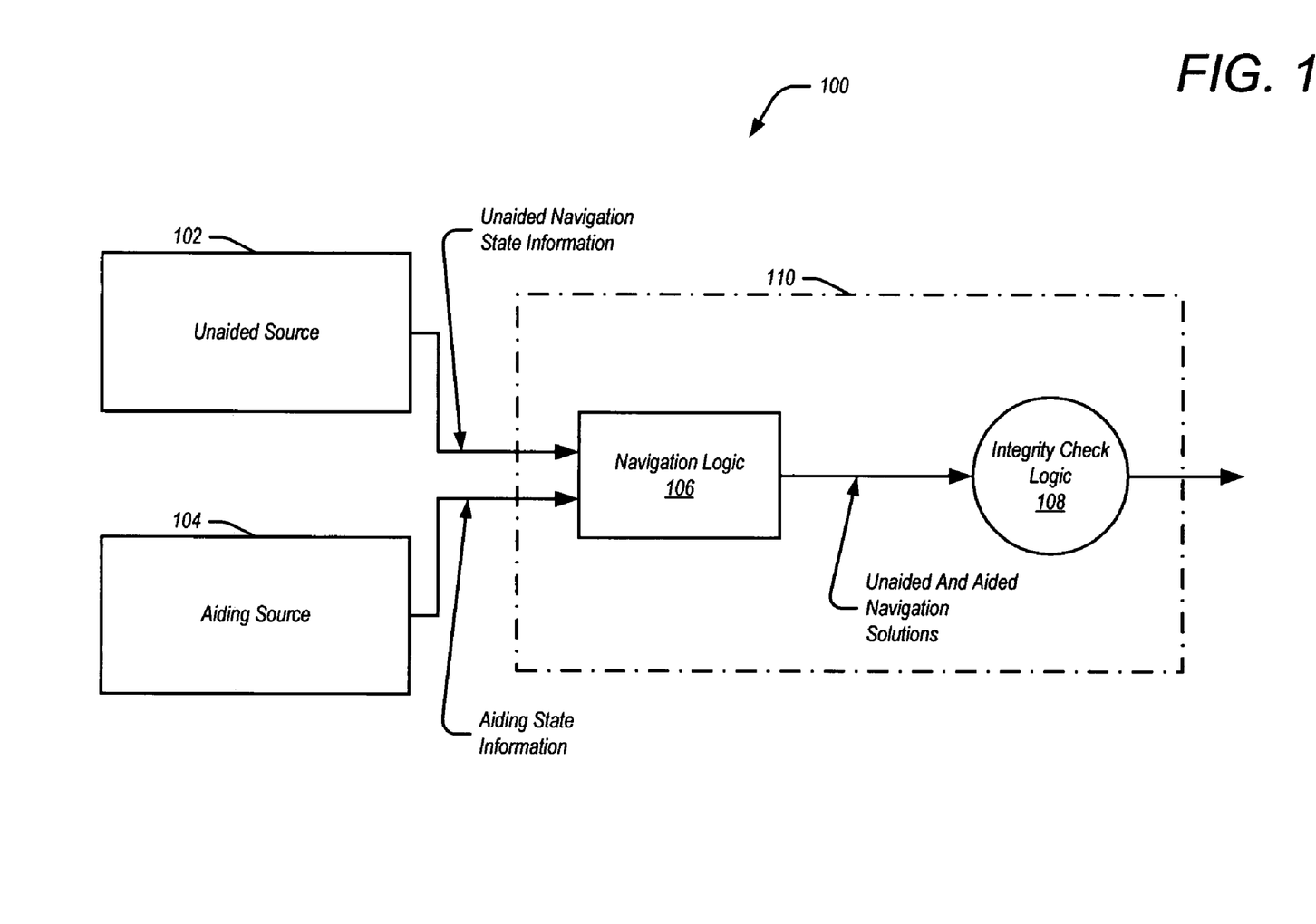
FIG. 1 is a block diagram illustrating a system for carrying out an alignment process for an inertial reference system ("IRS") in accordance with an exemplary embodiment.

FIG. 1 is a block diagram illustrating a system 100 for carrying out the alignment process for an IRS that is attached to a body, such as an aircraft, water-borne vessel or other vehicle. The system 100 may be integrated into, integral to or otherwise incorporated into the IRS. Included in the system 100 are an inertial or "unaided" source 102, an aiding source 104, and a processing system 110.

The unaided source 102 is operable to generate unaided navigational state information (hereinafter "unaided state information") using navigational information obtained from an inertial reference. The unaided state information may include all or portions of an attitude, position, and/or velocity of the body.

To facilitate generating the unaided state information, the inertial reference typically includes self-contained sensing instruments ("sensors") that have a precise angular orientation in space, and a particular angular alignment with the IRS, and thus, the body. Included among the sensors may be one or more gyroscopes, such as ring-laser gyroscopes, one or more accelerometers, and/or one or more barometric altitude devices.

The aiding source 104 is operable to generate aiding state information using navigational information from one or more references external to the IRS. This navigational information may include data for calculating portions of an attitude, position, and/or velocity of the body.

To facilitate generating the aiding state information, the aiding source 104 may be embodied as a receiver or transceiver (collectively referred to hereinafter as a "receiver") that receives positioning and/or navigation information associated with the current state of the body. The receiver may be, for instance, a global positioning system ("GPS") receiver (commercial or military grade); air data device for obtaining air speed, angle of attack, etc; TACtical Air Navigation ("TACAN") receiver; an OMEGA satellite navigation receiver; a radio-ranging device; a Doppler radar device; a magnetometer; and the like. Accordingly, the aiding source 104 may gather aiding data (e.g., GPS data) from a reference external to the IRS (e.g., one or more GPS satellites).

Both of the unaided and aiding sources 102, 104 may be coupled to navigation logic 106 via the processing system 110. As such, each of the unaided and aiding sources 102, 104 may include respective output interfaces through which the unaided and aiding state information may be output to the processing system 110, and in turn, to navigation logic 106.

The processing system 110 may be, for example, a general purpose computing platform, a specialized computing platform, a Linux or other open source computing platform, a proprietary computing platform, and the like. Accordingly, the processing system 110 includes at least one processor and memory. Stored in the memory and executable by the processor is general and proprietary logic for carrying out the alignment process. For example, the processing system 110 may include control logic for operating two or more of the above-listed modes simultaneously. Thus, the control logic allows the processing system 110 to operate the stationary-alignment mode, for instance, as a primary alignment mode, and the aided-alignment mode as a secondary alignment mode.

The navigation logic 106 may be embodied as a software module that contains executable instructions for carrying out the alignment process. These instructions may be stored in the memory of and executed by the processing system 110. Alternatively, the navigation logic 106 may be embodied in firmware and/or hardware.

In either case, the navigation logic 106 may have input interfaces to obtain the unaided and aiding state information from the unaided and aiding sources 102, 104, respectively. Using the unaided and aiding state information, the navigation logic 106 may derive unaided and aided navigation solutions. To facilitate such derivation, the navigation logic 106 may include one or more recursive filters, such as a hybrid or Kalman filters, to process the unaided and aiding state information to derive the unaided and aided navigation solutions. The navigation logic 106 derives the unaided navigation solution using only the unaided state information. The aided navigation solution, however, is derived using both of the unaided and aiding state information.

The navigation logic 106 may have an output interface through which it feeds the unaided and aided navigation solutions to integrity-check logic 108. Accordingly, the integrity-check logic 106 may include one or more input interfaces through which it receives the unaided and aided navigation solutions.

The integrity-check logic 108 may also have an output interface through which it feeds the unaided navigation solution unless it determines that the aided navigation solution is better for navigating the movable body than the unaided navigation solution. In such case, the integrity-check logic 108 outputs the aided navigation solution via its output interface. To facilitate making this determination, the integrity-check logic 108 may be embodied as a software module that contains executable instructions for monitoring, comparing and/or otherwise evaluating the unaided and aided navigation solutions. These instructions may be stored in the memory of and executed by the processing system 110. Alternatively, the integrity-check logic 106 may be embodied in firmware and/or hardware.

As one skilled in the art will appreciate, the functions for carrying out the alignment of the IRS may be distributed among all its elements or, alternatively, concentrated among a few so as to take advantage of processing power and reduce unnecessary redundancies. Accordingly, the unaided and aiding sources 102, 104 may determine navigation solutions without the aid of the navigation logic 106. In one case, the unaided source 102 may be deployed with its own processor and recursive filter or filters to process the unaided state information to derive the unaided navigation solution. The aiding source 104, which in this case is coupled with the unaided source 102, may likewise be deployed with its own processor and recursive filter or filters to process not only the aiding state information, but also, the unaided state information to derive the aided navigation solution. The unaided and aiding sources 102, 104, instead of the navigation logic 106, may be coupled to and provide the aided and unaided navigation solutions to integrity-check logic 108. Other configurations are possible as well.

Alignment Overview

Figure 2:
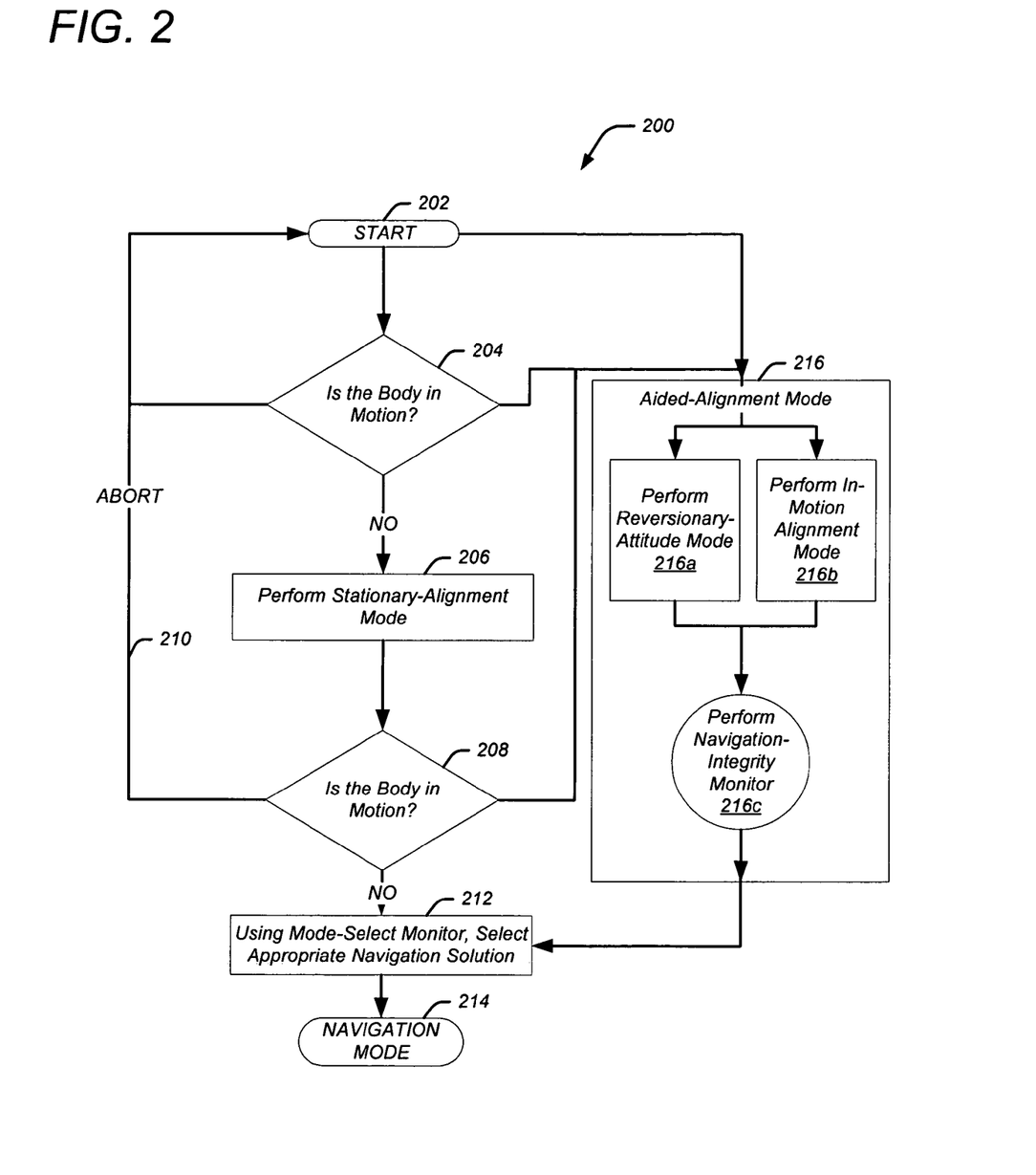
FIG. 2 is a first flow chart illustrating a flow for carrying out an alignment process for an IRS in accordance with an exemplary embodiment.

FIG. 2 is a flow chart illustrating a flow 200 for carrying out an alignment process for an IRS positioned aboard a body, such as an aircraft. Although it may be carried out by another system, the flow 200 described herein is described in reference to system 100.

The alignment process embodied by flow 200 may be carried out using the stationary-alignment mode and/or the aided-alignment mode. In this embodiment, the stationary-alignment mode is used as the primary mode for aligning the IRS, and the aided-alignment mode is carried out in a secondary mode. As the primary alignment mode, the unaided navigation solution that is developed during the stationary-alignment mode is used for navigating the aircraft unless the stationary-alignment mode cannot be used, which may occur, for example, when (i) the IRS experiences a loss of power when the body is in motion (e.g., when in navigation mode), and/or (ii) the IRS aborts stationary-alignment mode.

When stationary-alignment mode cannot be used, the IRS transitions to its secondary mode to carry out the aided-alignment mode. In the aided-alignment mode, a default navigation solution developed using a recovery mode, such as the reversionary-attitude mode, is used for navigating the aircraft unless a replacement navigation solution that is developed using the in-motion alignment mode provides the better navigation solution. Then, the replacement navigation solution is used in place of the default navigation solution.

The flow 200 starts at block 202 after a power cycle of the IRS. The power cycle may be initiated, for example, when the power sources of the IRS are interrupted or turned off for a predetermined period time greater than, e.g., 20 milliseconds. Interrupting or turning off the power supplies causes a reset, which in turn, causes a powering off of the IRS and its components including the processing system 110, the unaided device 102, the aided device 104, the navigation logic 106, and the integrity-check logic 108. After reset, power may again be applied to the IRS and its components, thereby completing the power cycle.

As shown in decision block 204, a test is performed to determine if the aircraft is in motion. If the aircraft is in motion (i.e., if aircraft movement exceeds an excessive motion threshold), then the stationary-alignment mode cannot be used. Therefore, the flow 200 transitions to block 216 in which the aided-alignment mode may be carried out, as will be described in greater detail below.

On the other hand, when the aircraft movement is non-existent (i.e., stationary) or below the excessive motion threshold, the flow 200 may transition to block 206 to carry out the stationary-alignment mode. The system 100 (via its control logic), however, may choose to concurrently initialize both the aided-alignment mode and the stationary-alignment mode after a power cycle to minimize delays that may occur when initializing the aided-alignment mode at a later time. Thus, the decision block 204 may be discarded in favor of decision block 208 (below), noting that the stationary-alignment mode is still the primary mode for aligning the IRS unless it cannot be used.

In block 206, the processing system of the IRS (and its associated software) performs the stationary-alignment mode. As described in more detail below, the navigation logic 106 uses the unaided source 102 instead of the aiding source 104 to carry out the stationary-alignment mode, and thus, is not dependent upon external information to achieve navigational capability. Instead, the navigation logic 106 may use one or more of its recursive filters to resolve the unaided state information to develop a velocity, position, pitch, roll, and heading to a desired or required accuracy.

During the stationary-alignment mode, a test is performed to determine if the aircraft is in motion, as shown in decision block 208. If the aircraft begins to move or exhibits excessive motion while the stationary-alignment mode is being carried out, then the stationary-alignment mode is aborted, and the process either returns to the start block 202, as shown by return path 210, or proceeds to block 216 to perform the aided-alignment mode, which as noted above, may be executing in the secondary mode.

For example, when the aircraft motion remains below an excessive motion threshold (as indicated by accelerometers or GPS autonomous ground speed, for instance) for the duration of the stationary-alignment mode, then the unaided navigation solution may be used to transition the system 100 to the navigation mode. If, however, the aircraft begins to move and/or surpasses an excessive motion threshold, then the system 100 may abort the stationary-alignment mode. Thereafter, the system 100 may begin using the aided-alignment mode to align the IRS.

Assuming that the aircraft remained below the given velocity for the duration of the stationary alignment, then, at the end of the stationary-alignment mode, the IRS provides to the integrity-check module 108 the unaided navigation solution. This unaided navigation solution may include a complete navigation state of the aircraft, which typically allows the IRS to achieve navigational capability. The unaided-navigation solution in this case may include not only a velocity and position of the aircraft, but also a complete attitude. The attitude of the aircraft generally includes the pitch, roll and heading of the body.

Given that the stationary-alignment mode is completed, the integrity-check module 108, via a mode-select monitor, outputs the unaided-navigation solution for navigating the aircraft instead of any navigation solution provided by the aided-alignment mode, as shown in block 212. When the unaided-navigation solution has a complete navigation state whose accuracy meets one or more alignment-completion thresholds, then the system 100 may transition the IRS to the navigation mode, as shown block 214. These alignment-completion thresholds may be chosen to satisfy Aeronautical Radio, Inc. (ARINC) 704 accuracy levels. Such accuracy levels, may include for example, pitch and roll uncertainty levels, which may be set to be at least as good as 0.1° 2σ; and the heading uncertainty levels, which may be set to be at least as good as 0.4° 2σ.

Referring now to block 216, the system 100 may enter the aided-alignment mode (i) in response to a power cycling of the IRS, as shown in block 202, or (ii) in response to a failure of the stationary-alignment mode, as shown in blocks 204, 208. In any case, after power is applied to the elements of the system 100, the processing system 110, unaided source 102, aiding source 104, and other components of the IRS may become operable (i.e., reach an operational state) to provide quick recovery of unaided and aiding state information. This unaided and aiding state information may include at least a portion of an attitude, body rate, and body acceleration of the aircraft. Depending on power-on response times of the processing system 110, unaided source 102, aiding source 104, and the other components, this navigation information may be available in, for example, a few milliseconds.

Alternatively, the processing system 110, unaided source 102, aiding source 104, and the other components IRS may be provisioned to meet performance levels to attain certification under a FAA TSO, such as the FM TSO C4c. Under FM TSO C-4c, the IRS and its components must reach operational state so as to provide the pitch and roll portion of the attitudes with less error than 2.5 degrees within 1 second. The time to reach operation state, however, may be greater than or less than the above-noted examples.

Under the aided-alignment mode, the system 100 (via the navigation logic 106) may provide the IRS with the unaided and aided navigation solutions depending on the availability of unaided and aiding state information from the unaided and aiding sources 102, 104. For example, the navigation logic 106 may be operable to develop, as a default output, the unaided navigation solution using the unaided state information. Such unaided navigation solution may be developed using the reversionary-attitude mode, as shown in block 216a. Using unaided and aiding state information, however, the navigation logic 106 may modify the default navigation solution or develop the aided navigation solution as the replacement navigation solution. This replacement navigation solution may be developed using the in-motion alignment mode, as shown in block 216b.

After developing the default and replacement navigation solutions, the navigation logic 106 may send them to the integrity-check logic 108. The integrity-check logic 108, via its navigation-integrity monitor as shown in block 216c, may then output to the mode-select monitor the default navigation solution unless it determines that the replacement navigation solution is better for navigating the movable body than the default.

After selecting the desired navigation solution via the mode-select monitor, the system 100 provides it to the IRS so that it can be used for navigating the aircraft, as shown in block 212. When the desired navigation solution includes a complete navigation state whose accuracy satisfies the alignment-completion thresholds, the IRS enters the navigation mode at end block 214.

The above-described embodiment of the alignment for the IRS is provided for exemplary purposes only. Those skilled in the art will recognize that the alignment may be carried out in a different manner, using more or less steps, and in a different order than presented. For instance, the following describes two alternative examples for carrying out the alignment under normal performance conditions for an aircraft.

EXAMPLE 1

In this first example, the aircraft is sitting in a stationary condition with a true heading at 90° (east) when the self-alignment mode is initiated. The system 100 (via its control logic) enters the stationary-alignment and aided-alignment modes to concurrently develop the unaided and aided navigation solutions. Because the aircraft is not experiencing a velocity to provide an initial estimated heading value, the aided-alignment mode sets the initial heading to default, which is not 90° (east), but rather 0° (north).

If the aircraft remains stationary, then the stationary-alignment mode takes precedence over the aided-alignment mode. In such case, the integrity-check module 108 determines that the unaided navigation solution from the stationary-alignment mode takes precedence over the aided navigation solution. If, however, the aircraft begins moving east, which may be indicated by the aiding state information (e.g., GPS data), before the stationary-alignment mode completes, then the navigation logic 106 executes an in-motion alignment algorithm component of the in-motion alignment mode in addition to executing the reversionary-attitude mode.

The in-motion alignment algorithm integrates the unaided and aiding state information along the incorrect heading of 0° (north), which causes the aircraft heading to be quickly determined. Such quick determination occurs because (i) the east-position change (as indicated by an aiding source 104) and the north position change (as indicated by the unaided source 102) result in heading inconsistencies; and (ii) the heading inconsistencies may be used by the navigation logic 106 and in-motion alignment algorithm to quickly calculate and converge upon a correct heading.

EXAMPLE 2

In this second example, the aircraft is cruising at a 0° (north) true heading with a cross wind from the west. The in-motion alignment algorithm is initialized to a GPS track angle of 15° when the true aircraft heading is actually 0° (north). If the aircraft conditions (e.g., aircraft heading, velocity, and the cross wind) remain constant, then the in-motion alignment algorithm gyrocompasses using earth and transport rates to converge on the true heading of 0° (north).

To this end, one or more GPS velocity measurements, which may indicate a change in position, are used to account for the aircraft velocity such that its gyrocompassing is similar to that of the stationary-alignment mode. However, unlike stationary-alignment mode, the in-motion alignment algorithm is operable at high latitudes since the aircraft transport rate can be used to compensate for a diminished horizontal earth rate.

If the aircraft accelerates along the true heading of 0° (north), then (i) the GPS velocity measurement in the north direction may change and (ii) the GPS velocity measurement in the east direction may remain constant. The in-motion alignment algorithm, which believes the aircraft to have a heading of 15°, may integrate the unaided state information (e.g., accelerometer data) into a north and east velocity change. This inconsistent velocity change may result in a faster convergence to the true heading of 0° (north).

If, however, the aircraft turns from the true heading of 0° (north) to a true heading of −90° (west), the GPS velocity measurement received from the aiding source 104 may be non-existent in the north direction and entirely existent in the east/west direction. This inconsistency indicates different velocities in the north and east directions, and thus, results in a faster convergence to the correct heading.

Exemplary Aided Alignment

Figure 3:
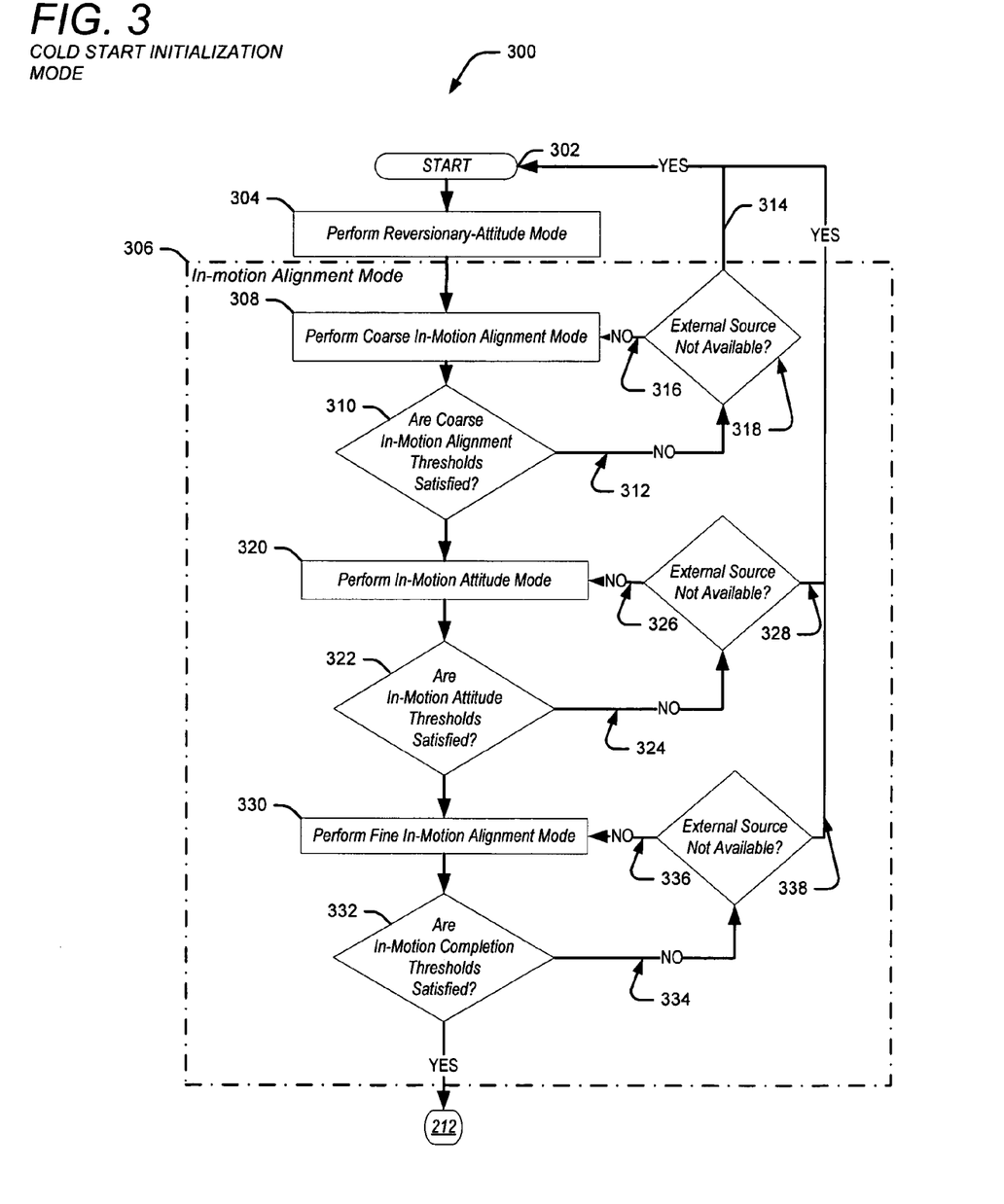
FIG. 3 is a second flow chart illustrating a first process flow for performing an aided-alignment mode of the alignment process in accordance with an exemplary embodiment.
Figure 4:
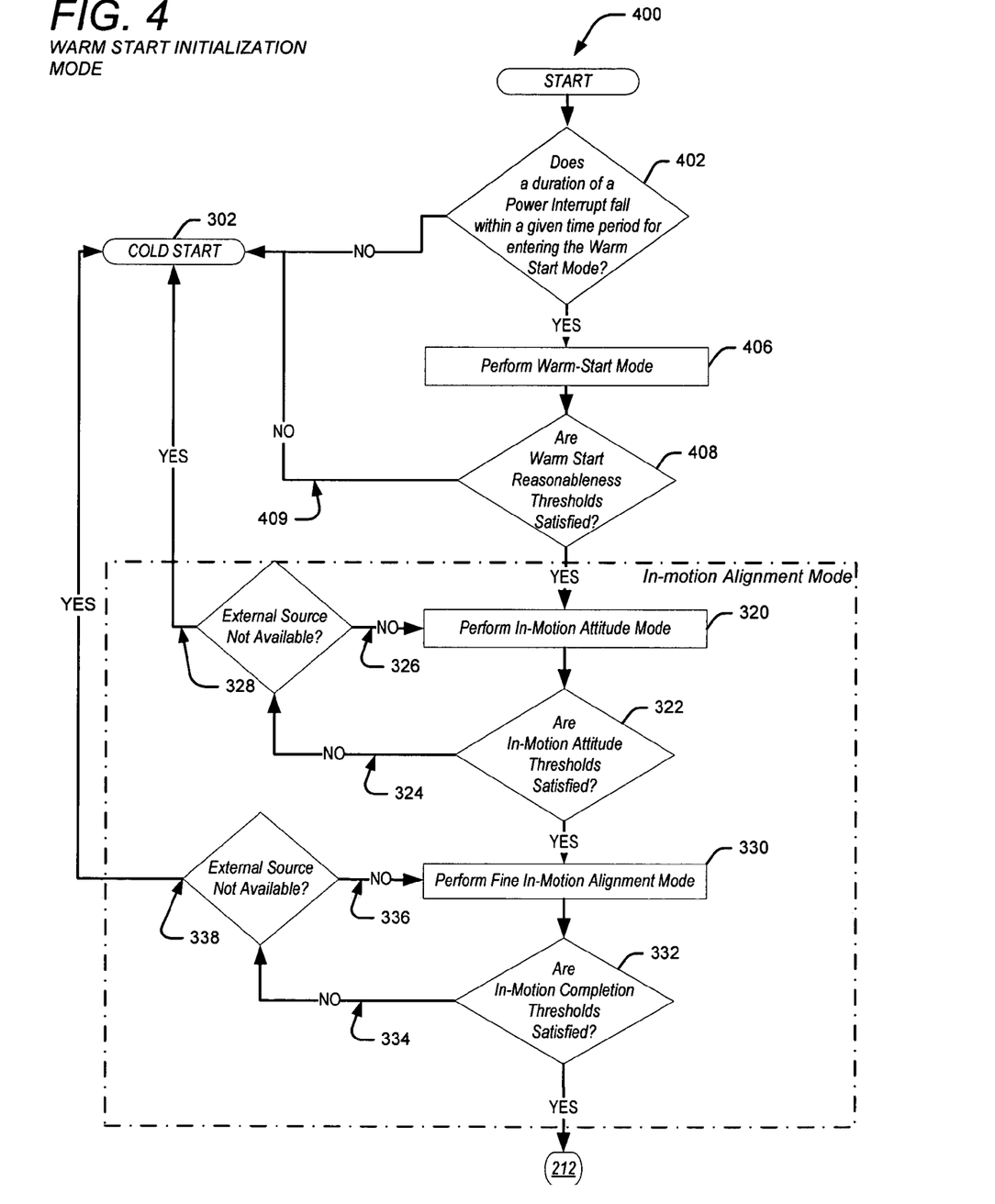
FIG. 4 is a third flow chart illustrating a second process flow for performing an aided-alignment mode of the alignment process in accordance with an exemplary embodiment.
Figure 5:
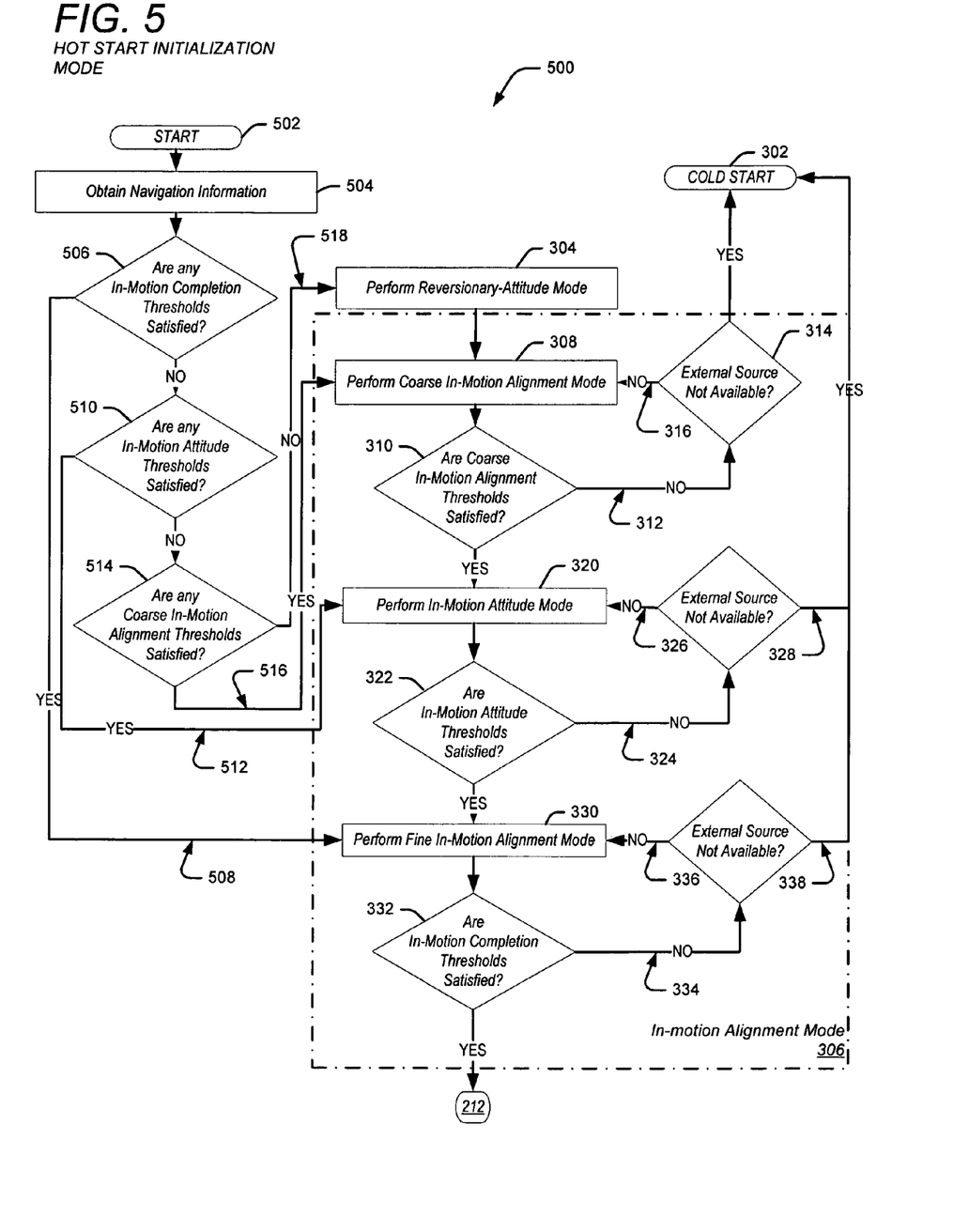
FIG. 5 is a fourth flow chart illustrating a third process flow for performing an aided-alignment mode of the alignment process in accordance with an exemplary embodiment.

FIGS. 3-5 are flow diagrams illustrating respective process flows 300-500. Each of the process flows 300-500 illustrates an exemplary embodiment for performing the aided-alignment mode. In the following description, all of the process flows 300-500 are described in reference to the system 100 and the aided-alignment mode shown in block 216 as described above. However, each of the process flows 300-500 may be carried out using a different architecture or in other modes.

Exemplary Combination of Reversionary-Attitude and In-Motion Alignment Modes

Referring now to FIG. 3, the process flow 300 for performing the aided-alignment mode is illustrated. This process flow 300 may employ a combination of the in-motion alignment and reversionary-attitude modes. The in-motion alignment and reversionary-attitude modes may provide different navigation solutions depending on the navigation information from the unaided and aiding sources 102, 104.

For example, the navigation logic 106 may develop the default navigation solution as a function of the unaided state information when operating in the reversionary-attitude mode. When operating in in-motion alignment mode, the navigation logic 106 may develop the replacement navigation solution using the aided and unaided state information. The integrity-check logic 108 ensures that the default navigation solution is output from the system 100 to the IRS unless the replacement navigation solution provides a better navigation solution. In such case, the integrity-check logic 108 outputs the replacement navigation solution.

The in-motion alignment and reversionary-attitude modes may be carried out in a concurrent or a sequential flow. In the concurrent flow, the navigation logic 106 processes the unaided and aiding state information received from the unaided and aiding sources 102, 104 to simultaneously develop both the default and replacement navigation solutions.

In the sequential flow, the navigation logic 106 first derives the default navigation solution using the unaided state information, and then outputs the default navigation solution to the integrity-check logic 108. The default navigation solution is then used to initialize the unaided state information for developing the replacement navigation solution. Using such unaided state information along with the aiding state information from the aiding source 104, the navigation logic 106 then derives the replacement navigation solution. Thereafter, the navigation logic 106 outputs the replacement navigation solution (in addition to the default navigation solution) to the integrity-check logic 108. As noted above, the integrity-check logic 108, via the navigation-integrity monitor, outputs to the IRS the default navigation solution unless the replacement navigation solution is better.

Cold-Start-Initialization

Referring to FIG. 3 at block 302, the IRS enters the aided-alignment mode after experiencing a power cycle as noted above. Entering the aided-alignment mode after such a power cycle may be referred to as a "cold-start-initialization mode," since the system 100 is reset causing its operating parameters to be initialized (or re-initialized) to a start condition. If the aircraft is operating unaccelerated (i.e., constant velocity, heading, and pitch), then the cold-start-initialization may complete in a short period, for example, less than 1.0 second. During this short period, the elements of the system 100, such as the processing system 110, unaided source 102, aiding source 104, may become operable. If, however, the aircraft is operating under varying conditions, the duration of the cold-start-initialization may be longer. This may be due to variations in total acceleration, yaw rate, and/or pitch rate conditions, which do not satisfy reasonableness thresholds.

Reversionary-Attitude Mode

Assuming that the flow 300 is a sequential flow, the system 100 enters and performs the well known reversionary-attitude mode, as shown in block 304. The reversionary-attitude mode may be initialized on the ground and in the air, as noted above. Using the unaided state information, the navigation logic 106 may implement a non-accelerating assumption via a second order control loop (noted above) to maintain a leveled platform to derive pitch and roll attitudes, and platform heading.

In one exemplary embodiment, the pitch and roll attitudes computed during reversionary-alignment mode may meet the pitch and roll attitude performance levels specified in FM TSO C-4c. Since the navigation logic 106 does not transmit a valid heading (magnetic, true or otherwise) output when in the reversionary-attitude mode, the system 100 periodically needs a set heading input to the navigation logic 106 to maintain an accurate heading output.

In addition to the reversionary-attitude mode, the system 100 may perform the in-motion alignment mode at block 306 to attempt to improve the navigational state of the IRS, and preferably, reach a navigation solution having a complete navigational state whose accuracy satisfies one or more alignment-completion thresholds. A transition to the in-motion alignment mode may occur when, for example, one or more of the following conditions are satisfied. These conditions may include, for example, (i) the availability of and receipt by the aiding source 104 of valid Aeronautical Radio, Inc. (ARINC) 743A compliant or other GPS data, which may include autonomous and satellite measurement data or blocks; (ii) when a GPS Horizontal Integrity Limit (HIL) for the aircraft is less than about 2.0 nautical miles (nm); (iii) when a parameter indicative of the movement of the aircraft is indicating that the aircraft is or was in motion; and/or (iv) when a parameter indicative of successful entry into the reversionary-attitude mode is set as such.

One scenario where the system 100 will delay performing the in-motion alignment mode is when GPS data is not available due to, for example, a GPS receiver or transmission failure. To reduce the amount of time the system 100 may need to complete the in-motion alignment mode, it may be initialized along with stationary-alignment mode as noted above. This allows the in-motion alignment mode to have a head start when the aircraft moves during the stationary-alignment mode, and/or to take advantage of the body's motion to decrease the convergence time of an in-motion alignment filter.

In-Motion Alignment Mode

The in-motion alignment mode may be carried out in a number of sequential modes, such as a coarse in-motion alignment mode followed by an in-motion attitude mode, which in turn, is followed by a fine in-motion alignment mode. Before being able to transition from the coarse in-motion alignment mode to the in-motion attitude mode, the replacement navigation solution has to satisfy one or more completion thresholds, namely coarse in-motion alignment thresholds. Similarly, before transitioning from the in-motion attitude mode to the fine in-motion alignment mode, the replacement navigation solution has to satisfy one or more in-motion attitude thresholds. Finally, to transition from the fine in-motion alignment mode to the navigation mode, the replacement navigation solution has to satisfy one or more in-motion completion thresholds.

After entering each mode, the replacement navigation solution from the previous mode, excluding the coarse alignment mode, is used to initialize the navigation solution for the next step. When entering into the coarse in-motion alignment mode, the navigation solution that was developed in the reversionary-attitude mode is used to initialize the navigation solution for the coarse in-motion alignment mode.

Coarse In-Motion Alignment Mode

At block 308, the navigation logic 106 develops the replacement navigation solution using a coarse in-motion alignment mode. The coarse in-motion alignment mode is a first step before entering into or recovering to the navigation mode. To carry out the coarse in-motion alignment mode, the navigation logic 106 employs its one or more recursive filters.

The in-motion alignment filter processes available unaided and aiding state information to estimate errors in attitude, velocity, and position. The aiding state information may be derived from global position data, such as ARINC 743A GPS data. Accordingly, the in-motion alignment mode allows the system 100 to derive the replacement navigation solution, including the azimuth, when the aircraft is in motion.

The recent unaided and aiding state information is input into the in-motion alignment filter. The recent unaided state information may include a combination of pitch and roll angles from the reversionary-attitude mode, which are assigned during initialization. Additionally, the initial inertial-reference heading is set to the GPS track angle. The GPS track angle may be determined, for example, using the arctangent of the GPS east and north velocities.

The in-motion alignment filter converges faster when body acceleration is present because measured acceleration may be mistransformed due to an incorrect knowledge of heading. This, in turn, creates an inertial velocity error followed by an inertial position error. The inertial position may be compared to a position generated from the aiding state information. As a result of the comparison, a correction to the inertial heading is generated.

The coarse in-motion alignment filter may continue to apply the unaided and aiding state information until the replacement navigation solution satisfies one or more uncertainty thresholds for the coarse in-motion alignment mode are satisfied. These uncertainty thresholds may include, for example, pitch and roll uncertainty thresholds, which may be set to be at least as good as 5.0° 2σ; the heading uncertainty threshold, which may be set to be at least as good as 2.5° 2σ (although, the initial heading error may be 180° off ); and the horizontal velocity uncertainty threshold, which may set to be as good as 20 m/s 2σ, as noted above and shown in block 310.

If some or all of these thresholds are not met, then coarse in-motion alignment mode may be aborted, as shown by paths 312 and 314, or continue indefinitely, as shown by return paths 312 and 316 (assuming that navigation information is available from the aiding source 104). In either case, however, the integrity-check module 108 may continue to output the default navigation solution without any modification.

In addition, the system 100 may cause the IRS to abort from the coarse in-motion alignment mode after experiencing unavailability or loss of aiding state information, such as ARINC 743A GPS data, as shown by block decision block 318 and return path 314. Upon returning to the start 302, the in-motion alignment mode may be re-initialized when the aiding state information, e.g., GPS data, is again available.

If the coarse in-motion thresholds are satisfied (e.g., heading error uncertainty), as shown in block 310, then the coarse in-motion alignment mode may transition to a second intermediate step. This second step is the in-motion attitude mode, as shown in block 320.

In-Motion Attitude Mode

After transitioning to the in-motion attitude mode, the navigation solution from the coarse in-motion alignment may be carried over to initialize the in-motion alignment filter for the in-motion attitude mode. In block 320, during the in-motion attitude mode, the in-motion alignment filter converges so as to cause the replacement navigation solution to approach, and preferably, satisfy in-motion attitude thresholds. These in-motion attitude thresholds may include, for example, (i) a heading covariance value at least as good as 2.5° 2σ; (ii) a pitch covariance value at least as good as 0.5° 2σ; and (iii) a roll covariance at least as good as 0.5° 2σ.

Alternatively, the in-motion attitude thresholds may be selected to meet performance levels to attain certification under a FM TSO, such as the FM TSO C4.c, C-5e and C-6d performance levels. By satisfying the in-motion attitude thresholds, the in-motion attitude mode provides advantages, such as (i) improved accuracy for the pitch and roll attitudes, and (ii) self determined true and magnetic heading outputs that are not subject to vertical earth rate drifts.

The in-motion attitude mode proceeds until all of the in-motion attitude thresholds are satisfied, as shown in decision block 322. When all the in-motion attitude thresholds are satisfied, the replacement navigation solution is sent to the integrity-check logic 108.

The integrity-check logic 108, via the navigation-integrity monitor, may then determine that the replacement navigation solution is better than the default navigation solution, and output the replacement navigation solution instead of the default navigation solution. In addition, the IRS is then transitioned to the fine in-motion alignment mode, as shown in block 330. If, however, the navigation-integrity monitor determines that the replacement navigation solution is not better, it may continue to output the default navigation solution.

If, however, the in-motion attitude thresholds are not satisfied, then the in-motion attitude mode may continue indefinitely, as show by return paths 324 and 326. Thus, the navigation logic 106 may continue to replace the last navigation solution (default or otherwise) with the most recent replacement navigation solution, if such is better than the last navigation solution.

Like the coarse in-motion alignment mode, the in-motion attitude mode may use GPS data, such as ARINC 743A GPS data, to help determine the replacement navigation solution. When the unavailability or loss of this data or other navigation information from the aiding source 104 occurs, the IRS may abort the in-motion alignment mode, as shown by return path 328 to the start 302. Upon returning to the start 302, the in-motion alignment mode may be re-initialized when GPS data is again available. To alleviate GPS data integrity concerns, executing both the reversionary-attitude and in-motion alignment modes concurrently allows the integrity-check logic 108 to output the default navigation solution if such failures occur.

Fine In-Motion Alignment Mode

After exiting the in-motion attitude mode, the system 100 enters the fine in-motion alignment mode at block 330. The fine in-motion alignment mode is another step carried out by the system 100 before entering the navigation mode. The replacement navigation solution provided in this mode becomes the primary navigation solution, thereby replacing the default or the last replacement navigation solution from the in-motion attitude mode. Preferably, this replacement includes the complete navigation solution. The navigation logic 106 may output the replacement navigation solution while continuing to develop the replacement navigation solution as the complete navigation, i.e., one with accuracy levels to attain full navigation.

To minimize a step potential resulting from the difference in navigation solutions t when replacing the default navigation solution with replacement navigation solution, and vice-versa (e.g., when transitioning between the in-motion attitude mode and in fine in-motion alignment mode ), a smoothing function (e.g., a linear smoothing function), may be implemented. As the fine in-motion alignment mode proceeds, the in-motion alignment filter continues to converge until the following completion criteria are met, as shown by decision block 332 and return paths 334 and 336.

The completion criteria, which allow the fine in-motion alignment mode to provide a complete navigation solution, may include (i) pitch and roll uncertainty thresholds, which may be set at about 0.10° 2σ; (ii) a heading uncertainty threshold, which may be set to at least as good as 0.4° 2σ, and (iii) a horizontal velocity uncertainty threshold, which may be set to at least as good as 2 m/s 2σ. Other threshold values are possible as well.

While in the fine in-motion alignment mode, the replacement navigation solution being output may be dependent upon the availability and integrity of GPS data. The GPS data alone, however, may not provide adequate integrity to meet some stringent integrity requirements for some IRS computed navigation solutions. Consequently, the integrity-check device 108 may again use the navigation-integrity monitor to monitor and compare the navigation solutions, including the aircraft attitudes, provided from the reversionary-attitude and fine in-motion alignment mode.

The navigation-integrity monitor ensures that the pitch and roll attitudes of the navigation solution output during the fine in-motion alignment mode are not used unless they are better than those of reversionary-attitude mode. By doing so, the navigation-integrity monitor ensures that GPS failures do not affect the integrity of the output of the system 100 and in turn, the IRS.

Until all the in-motion completion thresholds are satisfied, the navigation-integrity monitor may be used to compare the replacement navigation solution with the default navigation solution to ensure that the replacement navigation solution remains the better navigation solution. If the default navigation solution again becomes the better navigation solution, the system 100 may quickly transition back to using the default navigation solution, as shown by return path 338.

When transitioning back to using the default navigation solution, the initial heading in the reversionary-attitude mode may be approximately equal to the last heading output from the fine in-motion mode that passed the navigation-integrity monitor. The smoothing function (e.g., five second linear smoothing function) may be implemented for the transition from using the replacement navigation solution to using the default navigation solution to minimize a step potential resulting from a difference in the default and replacement navigation solutions.

On the other hand, after the completion criteria are met at block 332, the navigation logic 106 may transition to the navigation mode and output the replacement navigation solution. This allows the system 100, and in turn, the IRS to provide complete navigation capability to the aircraft (i.e., enter the navigational mode).

After entering the navigation mode, the system 100 generally uses the unaided source 102 for determining the navigation solution. The aided-alignment, and in particular, the in-motion alignment mode, may complete within a variable time range. That is, the time to completion is not deterministic. Rather, the duration of the aided-alignment may be (i) dependent upon latitude and maneuvers of the aircraft, and (ii) based upon the uncertainty of the in-motion alignment filter error states, such as the heading error state.

The above-described embodiments of the aided alignment are provided for exemplary purposes only. Those skilled in the art will recognize that the aided alignment may be carried out in a different manner, using more or less steps, and in a different order than presented.

Exemplary Combination of Warm Start and In-Motion Alignment Modes

FIG. 4 is a flow diagram illustrating the process flow 400 for performing the aided-alignment mode in accordance with another exemplary embodiment. This process flow 400 may employ a combination of the warm-start-initialization and in-motion alignment modes. The process flow 400 is substantially similar to the flow 300 of FIG. 3, except as described below.

Warm-Start-Initialization Mode

As described in more detail below, the warm-start-initialization mode provides the IRS, under certain conditions, with an alternative method to initialize the aided navigation solution for developing the replacement navigation solution, rather than using the default navigation solution developed in the reversionary-attitude mode, and/or or, the coarse in-motion alignment mode. This method may also used to initialize the unaided navigation solution for developing the default navigation solution. The warm-start initialization mode takes advantage of (i) a short-term outage of the system 100 after a brief interruption of power, and (ii) an ability of the processing system 110 to store a navigation solution developed during the navigation mode in the memory of the processing system 110 prior to the short-term outage.

At decision block 402, the processing system 100 determines whether to enter the warm-start-initialization mode. The warm-start-initialization mode may be entered under certain power interruption scenarios of the system 100. One such scenario occurs when one or both of the power sources of the system 100 (or IRS) experience an interruption of power for a given period, such as between 20 and 200 milliseconds.

When the interruption is less than the lower end of the given period (e.g., 20 milliseconds), it is generally not considered a power interruption. On the other hand, if the interruption continues for more than the upper end of the given period, then the system 100 will enter the cold-start-initialization mode, as shown in block 302.

At block 406, the system 100 enters the warm-start-initialization mode. Upon entering the warm-start-initialization mode, the IRS and its components, including the processing system 110, the unaided source 102, the aiding source 104, the navigation logic 106, and the integrity-check logic 108 may be quickly restarted so as to reach operational state in a short period of time. For example, the IRS and its components may be operational so as to provide a new attitude (i.e., a new pitch, roll, and heading), new body rates, and new body accelerations in a period of less than 1 second upon entering the warm-start-initialization mode.

Once restarted, the processing system 110 obtains from memory the navigation solution and/or unaided state information stored prior to the short-term outage. After obtaining the navigation solution and/or unaided state information, the processing system 110 performs appropriate integrity checks to assure the integrity of the navigation solution and/or unaided state information.

Thereafter, a corrected attitude may then be extrapolated across the short-term outage (i.e., over the total time that the system 100 (or IRS) was unable to provide the navigation solution and/or unaided state information. To do this, the processing system 110 may use the navigation solution and/or unaided state information stored prior to the short-term outage in combination with new unaided state information, e.g., new body rates, and new body accelerations generated after the short-term outage.

To most accurately extrapolate the corrected attitude, however, corrected attitude rates should be used instead of the new body rates. Typically, the corrected attitude rates are not available until after the corrected attitude is established since the calculation of the corrected attitude rates requires input of the corrected attitude and the new body rates.

As an alternative, the new body rates may be used as a good approximation of the corrected attitude rates for extrapolating the corrected attitude. Such approximation provides exemplary results at typical aircraft roll and pitch angles. The following equation ("EQ-1") provides an exemplary first-order attitude-extrapolation algorithm that may be used to determine the corrected attitude using the new body rates instead of the corrected attitude rates.

$$\text{Attitude } (n) = \text{Attitude } (n-1) + (\text{Attitude Rate } (n-1) + \text{Body Rate } (n))^* \Delta t / 2.0 \quad \text{(Eq. 1)}$$

The EQ-1 assumes constant aircraft angular rates during the short-term outage. After executing EQ-1, the corrected attitude may be compared to reasonableness thresholds for the warm-start-initialization mode ("warm-start reasonableness thresholds"), as shown in decision block 408. These warm-start reasonableness thresholds may account for typical variations in the aircraft angular acceleration, aircraft attitude, and knowledge of time of short-term outage. Knowledge of the time of the short-term outage may be input, for example, from timestamps stored in memory and/or sources outside the IRS, such as hardware circuitry held up via capacitors during the power outage.

If the warm-start reasonableness thresholds are not satisfied, then warm-start mode may be aborted, and as shown by path 409, the system 100 may transition the IRS to the cold-start-initialization mode noted above. If, on the other hand, at least one of the warm-start reasonableness thresholds are satisfied (e.g., heading error uncertainty), then the warm-start mode may transition to the in-motion attitude mode, as shown in block 320.

After transitioning the IRS to the in-motion attitude mode, the process flow 400 continues in the manner as described above with respect to the rest of the in-motion alignment mode of process flow 300. As an alternative to transitioning directly to the in-motion attitude mode, the process flow 400 may instead enter the coarse in-motion alignment mode.

Exemplary Combination of Hot Start and In-Motion Alignment Modes

Referring now to FIG. 5, the process flow 500 for carrying out the aided-alignment mode in accordance with an exemplary embodiment is shown. This process flow 500 may employ a hot-start-initialization mode, which provides the system 100, and in turn, the IRS with the ability to use unaided state information from an aborted stationary-alignment mode to develop the replacement navigation solution. This beneficially allows the IRS to use valuable unaided state information that would be otherwise lost or ignored. In addition, depending on the accuracy of such unaided state information, the duration of the aided-alignment mode may be reduced.

Hot-Start-Initialization Mode

For simplicity, the functions of the hot-start-initialization mode shown in FIG. 5 are added as an adjunct to the functions of the reversionary-attitude and in-motion alignment modes shown in process flow 300 (FIG. 3). However, the process flow 500 may be carried out in any embodiment of the aided-alignment mode.

At block 502, the system 100 enters the hot-start-initialization mode after aborting the stationary-alignment mode. Prior to aborting the stationary-alignment mode, however, the processing system 110 stores in memory and/or makes available the unaided state information from the aborted stationary-alignment mode.

Since the system 100 aborts the stationary-alignment mode, the unaided state information does not satisfy the alignment-completion thresholds to transition to the navigation mode. This may be because the unaided state information might not be a complete navigation solution. If, on the other hand the unaided state information is the complete navigation solution, then the accuracy of the unaided navigation information solution does not meet stationary-alignment-completion criteria.

At block 504, the processing system 100 obtains the unaided state information. The processing system 100 may obtain the unaided state information by retrieving it from memory or, alternatively, by having it passed to an appropriate element of the system 100 for carrying out the hot-start mode, such as the navigation logic 106.

After obtaining the unaided state information, the processing system 110 performs a first test to determine if the unaided state information satisfies any of the in-motion completion thresholds, as shown in decision block 506. If any of the in-motion completion thresholds are satisfied, then the system 100 initializes the navigation solution of fine in-motion alignment mode with the unaided state information from the hot start initialization, as shown by path 508. Thereafter the system 100 may continue to develop the replacement navigation solution in accordance with the fine in-motion alignment mode. After entering the fine in-motion alignment mode, the process flow 500 continues in the manner as described above with respect to the rest of the in-motion alignment mode of process flow 300.

If the unaided state information does not satisfy any of the in-motion completion thresholds, then the processing system 100 performs a second test to determine if the unaided state information satisfies any of the in-motion attitude thresholds, as shown in decision block 510. If any of the in-motion attitude thresholds are satisfied, then the system 100 initializes the navigation solution of in-motion attitude mode with the unaided state information from the hot start initialization, as shown by path 512. Then, the system 100 continues to develop the replacement navigation solution in accordance with the in-motion attitude mode (assuming, of course, that the unaided state information is used to develop the default navigation solution as well). After transitioning to the in-motion attitude mode, the process flow 500 continues in the manner as described above with respect to the rest of the in-motion alignment mode of process flow 300.

When the unaided state information does not satisfy any of the in-motion attitude thresholds, the processing system 110 may perform a third test to determine if the unaided state information satisfies any of the coarse in-motion alignment thresholds, as shown in block 514. If any of the coarse in-motion alignment thresholds are satisfied, then the system 100 initializes navigation solution of the coarse in-motion alignment mode with the unaided state information from the hot start initialization, as shown by path 516. Then, the system 100 continues to develop the replacement and default navigation solutions in accordance with the coarse in-motion alignment mode. After transitioning to the coarse in-motion alignment mode, the process flow 500 continues in the manner as described above with respect to the rest of the in-motion alignment mode of process flow 300. If the unaided state information does not satisfy any of the coarse in-motion alignment thresholds, then the system 100 may transition the IRS to fall back to the Cold-Start-Initialization Mode, as shown by path 518.

The above-described embodiment of the hot-start mode is provided for exemplary purposes only. Those skilled in the art will recognize that the hot-start mode may be carried out in a different manner, using more or less steps, and in a different order than presented. For instance, the processing system 100 may perform the first test to determine if the unaided state information satisfies all of the in-motion attitude thresholds necessary to transition the in-motion attitude mode instead of determining if any of the in-motion completion thresholds are satisfied. The second and third test in decision blocks 510, 514 may be likewise rearranged.

CONCLUSION

The foregoing detailed description describes one or more exemplary embodiments for implementing the aided-alignment mode, the stationary-alignment mode or some combination thereof. However, other variations may be made and intended to be within the scope of the invention. Further, while the aided-alignment mode is not limited to a particular architecture or field of use even though the foregoing describes avionics architecture.

Moreover, the system 100 and the aided-alignment mode deployed in civilian strapdown IRS and may provide many benefits to commercial aviation including improved dispatch reliability, reduced gate delays while waiting for IRS alignment, reduced turn-backs or diversions due to in-flight power interrupts resulting in loss of IRS, and improved high latitude alignments. When implementing the aided-alignment mode, the unaided source 102 may employ commercial grade inertial sensors, and the aiding source 104 may preferably use commercial grade GPS.

The aided-alignment mode provides the following features and/or benefits. First, the system 100 may be carried out automatically, therefore, not requiring pilot interaction. Second, the system 100 does not have special constraints or demands placed upon the aircraft flight path. Third, the system 100 has world wide alignment capability. At least a portion of the system 100 may be commercially embodied in the Honeywell Laseref™ V Micro IRS™. Details of the Honeywell Laseref™ V Micro IRS™ may be found in product brochure no. A60-0776-001-000 entitled "Laseref V Micro Inertial Reference System," published September 2001, the entire contents of which are incorporated herein by reference.

In the embodiments described above, the systems may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigured or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

In view of the wide variety of embodiments to which the principles of the present invention can be applied, it should be understood that the illustrated embodiments are exemplary only, and should not be taken as limiting the scope of the present invention. The operation described above may be performed in sequences other than that described, and more or fewer elements may be used in the block diagrams.

Further, the claims should not be read as limited to the described order or elements unless stated to that effect. In addition, use of the term "means" in any claim is intended to invoke 35 U.S.C. §112, ¶ 6, and any claim without the word "means" is not so intended. Therefore, all embodiments that come within the scope and spirit of the following claims and equivalents thereto are claimed as the invention.

We claim:

1. A method for aligning an inertial reference system that is coupled to a moveable body, the method comprising:
   (a) obtaining from an unaided source unaided navigation state information, wherein the unaided source generates the unaided navigation state information using navigation information provided by an inertial reference;
   (b) obtaining from an aiding source aiding state information, wherein the aiding source generates the aiding state information using navigation information provided by at least one external reference;
   (c) determining an unaided navigation solution using the unaided navigation state information;
   (d) determining an aided navigation solution using a combination of the unaided and aiding state information;
   (e) providing the unaided navigation solution for navigating the movable body;
   (f) performing an integrity check to determine whether the aided navigation solution provides a better navigation solution than the unaided navigation solution for navigating the movable body; and
   (g) replacing the unaided navigation solution with the aided navigation solution when the aided navigation solution provides a better navigation solution for navigating the movable body, wherein
   (i) the unaided navigation solution is an outcome of a reversionary-attitude alignment, and
   (ii) the aided navigation solution is an outcome of an in-motion alignment.

2. The method of claim 1, wherein unaided source comprises an inertial-data device, and wherein the aiding source comprises a device that obtains navigation information from at least one external reference.

3. The method of claim 1, wherein
  (i) the unaided navigation solution is an outcome of a stationary alignment, and
  (ii) the aided navigation solution is an outcome of an aided alignment.

4. The method of claim 3, wherein the unaided and aided navigation solutions are initialized concurrently in response to a power cycle of the inertial reference system.

5. The method of claim 3, wherein the aided navigation solution of the aided alignment is initialized using at least a portion of the unaided navigation solution of the stationary alignment.

6. The method of claim 3, wherein the unaided navigation solution comprises a first attitude of the body, wherein the aided navigation solution comprises a second attitude of the body, and wherein the first and second attitudes each comprise respective pitch, roll and heading data.

7. The method of claim 4, wherein the unaided navigation solution further comprises a first velocity and position of the body, and wherein the aided navigation solution further comprises a second velocity and position of the body.

8. The method of claim 1, wherein the unaided navigation solution comprises a pitch and roll of the body, but not a heading, wherein the aided navigation solution comprises an attitude of the body, and wherein the attitude comprises pitch, roll and heading data.

9. The method of claim 1, wherein the unaided navigation solution further comprises a first velocity and position of the body, and wherein the aided navigation solution further comprises a second velocity and position of the body.

10. The method of claim 1, wherein at least a portion of the unaided source is combined with at least a portion of the aiding source.

11. The method of claim 10, wherein the combined portions of the unaided and aiding sources obtain the navigation information from the inertial reference, and wherein the aiding source uses the navigation information from the inertial reference in combination with the navigation information provided by the at least one external reference to generate the aiding state information.

12. The method of claim 1, wherein the in-motion alignment is performed in response to a loss of power to at least a portion of the inertial reference system.

13. The method of claim 1, wherein the in motion alignment is performed in response to aborting a stationary alignment before completion.

14. The method of claim 13, wherein at least a portion of the aided navigation solution for the in-motion alignment mode is initialized using at least a portion of a navigation solution developed for the aborted stationary alignment.

15. The method of claim 1, wherein at least a portion of the aided navigation solution for the in-motion alignment mode is initialized using at least a portion of the unaided navigation solution developed for the reversionary-attitude alignment.

16. The method of claim 1, wherein at least a portion of the aided navigation solution for the in-motion alignment mode is initialized using navigation information developed by a warm-start initialization.

17. The method of claim 16, wherein the warm-start initialization is performed in response to a loss of power to at least a portion of the inertial reference system, wherein the loss of power is less than a given threshold of time, and wherein the navigation information developed by a warm-start initialization is developed by extrapolating a stored navigation solution across the given threshold of time.

18. The method of claim 17, wherein:
  (i) the navigation information developed by the warm-start initialization comprises a first attitude, wherein the first attitude comprises a pitch, roll, and heading of the body that is generated using navigation information provided by the inertial reference before and after the loss of power; and
  (ii) the aided navigation solution comprises a second attitude, wherein the second attitude comprises a pitch, roll and heading that is generated using navigation information provided by the inertial reference before and after the loss of power.

19. The method of claim 18, wherein the unaided navigation solution further comprises a first velocity and position of the body, and wherein the aiding navigation further comprises a second velocity and position of the body.

20. A system for aligning an inertial reference system that is coupled to a moveable body, the system comprising:
  an unaided source that is operable to generate an unaided navigation state information using navigation information provided by an inertial reference;
  an aiding source that is operable to generate an aided navigation state information using navigation information provided by at least one external reference;
  a navigation device that is operable to (i) determine an unaided navigation solution using the unaided navigation state information, and (ii) determine an aided navigation solution using a combination of the unaided and aiding state information; and
  an integrity-check device that is operable to (i) provide the unaided navigation solution for navigating the movable body, and (ii) replace the unaided navigation solution with the aided navigation solution when the aided navigation solution provides a better navigation solution for navigating the movable body,
  wherein (i) the unaided navigation solution is an outcome of a reversionary-attitude alignment, and (ii) the aided navigation solution is an outcome of an in-motion alignment.

21. The system of claim 20, further comprising control logic that is operable to inhibit using of the aiding state information after transitioning to a navigation mode.

22. The system of claim 20, wherein at least a portion of the unaided source is combined with at least a portion of the aiding source.

23. The system of claim 20, wherein unaided source comprises an inertial-data device, and wherein the aiding source comprises a device that obtains navigation information from at least one external reference.

24. The system of claim 23, wherein the inertial data device comprises at least one gyroscope, at least one accelerometer, and at least one altitude sensor.

25. The system of claim 23, wherein the aiding device comprises a device selected from the group consisting of a global positioning system receiver, a TACtical Air Navigation (TACAN) receiver, an OMEGA satellite navigation receiver, a Doppler radar device, a magnetometer, and a radio-ranging device.

26. The system of claim 20, wherein (i) the unaided navigation solution is an outcome of a stationary alignment, and (ii) the aided navigation solution is an outcome of an aided alignment.

27. The system of claim 26, wherein the unaided state and aided navigation solutions are initialized concurrently in response to a power cycle of the inertial reference system.

28. The system of claim 26, wherein the aided navigation solution of the aided alignment is initialized using at least a portion of the unaided navigation solution of the stationary alignment.

29. The system of claim 26, further comprising control logic that is operable to allow the stationary and aided alignments to be concurrently performed.

30. The system of claim 20, wherein the unaided and aided navigation solutions are initialized concurrently in response to a power cycle of the inertial reference system.

31. The system of claim 20, wherein the aided navigation solution is initialized using at least a portion of the unaided navigation solution of the stationary alignment.

32. The system of claim 20, wherein the system is operable to perform the in-motion alignment in response to a loss of power to at least a portion of the inertial reference system.

33. The system of claim 20, wherein the system is operable to perform the in-motion alignment in response to aborting a stationary alignment before completion.

34. The system of claim 33, wherein at least a portion of the aided navigation solution for the in-motion alignment mode is initialized using at least a portion of a navigation solution developed for an aborted stationary alignment.

35. The system of claim 20, wherein at least a portion of the aided navigation solution for the in-motion alignment mode is initialized using navigation information developed by a warm-start initialization.

36. The system of claim 20, wherein the warm-start initialization is performed in response to a loss of power to at least a portion of the inertial reference system, wherein the loss of power is less than a given threshold of time, and wherein the navigation information developed by a warm-start initialization is developed by extrapolating a stored navigation solution across the given threshold of time.

* * * * *

UNITED STATES PATENT AND TRADEMARK OFFICE
CERTIFICATE OF CORRECTION

PATENT NO. : 7,606,665 B2
APPLICATION NO. : 10/929825
DATED : October 20, 2009
INVENTOR(S) : Weed et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1451 days.

Signed and Sealed this

Twelfth Day of October, 2010

David J. Kappos
*Director of the United States Patent and Trademark Office*